(12) United States Patent
Nakahara

(10) Patent No.: US 7,040,707 B2
(45) Date of Patent: May 9, 2006

(54) SEAT BACK OF AUTOMOTIVE SEAT

(75) Inventor: Shigeru Nakahara, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/822,679

(22) Filed: Apr. 13, 2004

(65) Prior Publication Data

US 2005/0225155 A1    Oct. 13, 2005

(51) Int. Cl.
A47C 7/02 (2006.01)
A47C 1/10 (2006.01)

(52) U.S. Cl. ............. 297/452.27; 297/396; 297/452.42
(58) Field of Classification Search ........... 297/231.13, 297/396, 216.13, 452.2, 452.27, 452.23, 297/DIG. 1
See application file for complete search history.

(56) References Cited

U.S. PATENT DOCUMENTS

| 3,713,696 A | * | 1/1973 | Dudley | 297/452.55 |
| 5,437,498 A | * | 8/1995 | Waelde | 297/452.34 |
| 5,458,396 A | * | 10/1995 | Rost | 297/216.12 |
| 5,544,942 A | * | 8/1996 | Vu Khac et al. | 297/452.37 |
| 5,568,961 A | * | 10/1996 | Colasanti | 297/362.12 |
| 5,609,395 A | * | 3/1997 | Burch | 297/452.55 |
| 5,863,095 A | * | 1/1999 | Rivard et al. | 297/230.13 |
| 5,902,010 A | * | 5/1999 | Cuevas | 297/216.13 |
| 6,062,643 A | * | 5/2000 | Schroten et al. | 297/216.13 |
| 6,554,365 B1 | * | 4/2003 | Karschin et al. | 297/440.14 |
| 6,688,686 B1 | * | 2/2004 | McEvoy et al. | 297/284.4 |
| 6,817,673 B1 | * | 11/2004 | Walker et al. | 297/452.19 |
| 6,837,541 B1 | * | 1/2005 | Farquhar et al. | 297/216.13 |

FOREIGN PATENT DOCUMENTS

| JP | 2001-89959 | 4/2001 |
| JP | 2003-127737 | 5/2003 |

* cited by examiner

Primary Examiner—Peter M. Cuomo
Assistant Examiner—Sarah B. McPartlin
(74) Attorney, Agent, or Firm—Browdy and Neimark, PLLC

(57) ABSTRACT

A seat back of automotive seat, which comprises an upper seat back portion and a lower seat back portion. A foam padding of the upper seat back portion is greater in hardness than that of the lower seat back portion. A vent element is provided in each of the two seat back portions. The vent element may include a through-hole or a recessed portion, and/or a netted element provided on the lower seat back portion. The upper seat back portion is fixedly connected with the lower seat back portion in an integral manner by means of a connecting element disposed within both of those two seat back portions.

7 Claims, 4 Drawing Sheets

SEAT BACK OF AUTOMOTIVE SEAT

BACKGROUND OF THE INVENTION

1. Field of the Invention

The present invention relates to an automotive bucket seat, and in particular to a seat back of such automotive bucket seat.

2. Description of Prior Art

In general, an automotive bucket seat is of a relatively deep seating configuration to receive a seat occupant therein in an embracing way. Namely, the configuration of such bucket seat features a deeply recessed formation of its seat back, and the seat back per se is formed to have a main seating portion and a pair of forwardly protrudent side support portions. In particular, the waist and shoulder support regions of each of the two side support portions project more forwardly than the main seating portion to provide an improved embracing support touch to the seat occupant.

Some of the bucket seats of this kind have a divided seat back structure comprising upper and lower seat back portions, as disclosed from the Japanese Laid-Open U.M. Publication No. 63-118854. According thereto, a vertical adjustment mechanism is provided between the upper and lower seat back portions so as to enable vertical adjustment of the upper seat back portion with respect to the lower seat back portion to thereby provide an optimum back support area to a different physique of each different seat occupant.

However, in such conventional seat, all the upper and lower seat back portions are provided with a same foam padding of same hardness or density therein, and further, hard portions of the vertical adjustment mechanism and/or seat back frame connection portions are exposed adjacent to both sides of the seat occupant. As a consequence thereof, it is difficult to adjust a uniform embracing support touch to both of the upper and seat back portions. In particular, when applying a structural modification to the upper seat back portion to improve support touch to the head and shoulder portions of the seat occupant, it is quite difficult to structurally modify the lower seat back portion in order to attain a proper embracing support touch to the waist portion of the seat occupant accordingly. The exposed hard portions, such as a portion of the vertical adjustment mechanism or the seat back frame connection portions, gives an unpleasant hard touch to the lateral body portions of the seat occupant.

Moreover, in this kind of bucket seat, during a long period of time for his or her being seated therein, the seat occupant gets to feel hot and stuffy at the back portion and become uncomfortable in the seat. The same goes especially for the case where a heater is built in the seat back of the seat.

SUMMARY OF THE INVENTION

In view of the above-stated drawbacks, it is a first purpose of the present invention to provide an improved seat back of automotive seat which positively supports and holds the head and shoulder portions of a seat occupant, while moderately supports the trunk portion of the seat occupant.

In order to achieve such purpose, a seat back of automotive seat in accordance with the present invention is basically comprised of:

a lower seat back portion including a foam padding provided therein; and an upper seat back portion connected with an upper area of the lower seat back portion, the upper seat back portion including a foam padding provided therein, wherein the foam padding of the upper seat back portion is greater in hardness than the foam padding of the lower seat back portion.

It is a second purpose of the invention to avoid a stuffy, hot and moist state which can easily occur between the seat back and the back portion of seat occupant.

For that purpose, a vent means is provided in the seat back to allow air to flow at the lower and upper seat back portions. The vent means may comprise: a first vent hole means defined between the upper and lower seat back portions; and a second vent hole means defined in the lower seat back portions. Alternatively, in addition to the first and second vent hole means, the vent means may include a netted element provided on the forward surface of the lower seat back portion.

In one aspect of the present invention, a connecting means for connecting the upper and lower seat back portions is disposed within both the upper and seat back portions so as not to be exposed outwardly of the seat back, thus giving no unpleasant hard touch to a seat occupant.

Other various features and advantages will become apparent from reading of the description hereinafter, with reference to the annexed drawings.

DETAILED DESCRIPTION OF PREFERRED EMBODIMENTS OF THE INVENTION

Figure 1:
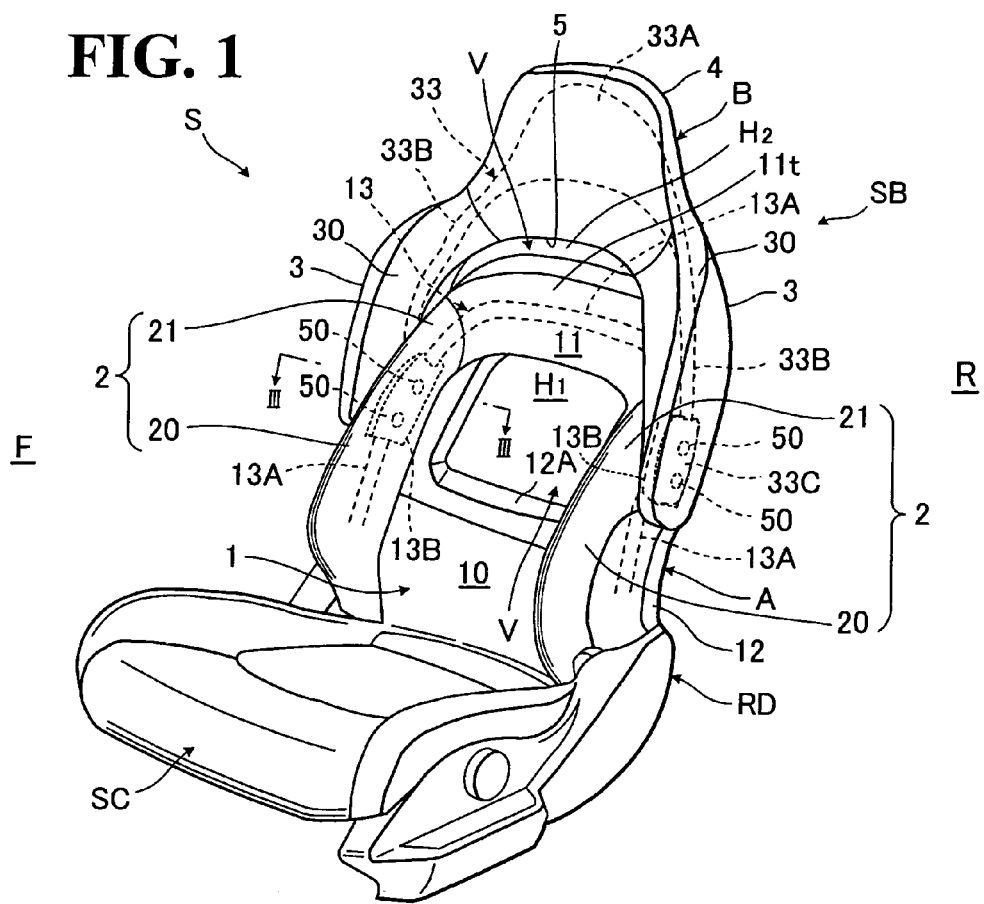
FIG. 1 is a schematic perspective view showing a seat back of the present invention which is provided in an automotive seat.

Referring to FIGS. 1 thorough 8, there are illustrated preferred embodiments of seat back (SB) of automotive bucket seat (S) in accordance with the present invention, the seat back (SB) being of a two divided structure comprising an upper seat back portion (B) and a lower seat back portion (A). Designation (SC) denotes a seat cushion of the seat (S).

Generically stated, in accordance with the present invention, the upper and lower seat back portions (B) (A) of seat back (SB) are of an optimum integral configuration for embracingly receiving and supporting the waist and lateral upper body portions as well as shoulder portion of an occupant sitting on the seat (S), as will be specified later, and, in addition thereto, the seat back (SB) is provided with a vent means (V) for allowing air to flow at the back support region of the seat back (SB) where the back of a seat occupant (not shown) is in a close contact with forward surface regions of the seat back (SB), thereby preventing that particular back support region from being in a hot, stuffy and moist state and thus giving a refreshing condition to the seat occupant's back portion.

As shown in FIG. 1, the lower seat back portion (A) is basically formed to have a pair of protuberant side bolster support regions (2) (2) and a main back support region (1) defined between those two side support regions (2).

The main back support region (1) is formed in a shape substantially conforming to a whole shape of the back of seat occupant.

On the other hand, the two side bolster support regions (2) (2) are each formed protuberant forwardly from the main back support region (1) in a shape generally conforming to one side of seat occupant's body trunk portion ranging from his or her armpit to waist. In this respect, designation (21) denotes an upper local area of the side bolster support region (2) which is adapted to support one side of an upper trunk portion of the seat occupant ranging substantially from his or her armpit to belly, and designation (20) denotes a lower local area of the side bolster support region (2) which is adapted to support one side of a lower trunk portion of the seat occupant ranging substantially from his or her belly to waist.

The upper seat back portion (B) is of a generally inverted-U-shaped configuration comprising: a headrest region (4); and a pair of shoulder support regions (3) (3) extending downwardly from the headrest region (4). More specifically, the upper seat back portion (B) is comprised of: an inverted-U-shaped framework (33) having a headrest frame (33A) and a pair of side support frames (33B) (33B); a foam padding (BP); and a trim cover assembly (BT). The foam padding (BP) is integrally formed on an entirety of the headrest frame (33A) and side support frames (33B), assuming a predetermined outer configuration of the upper seat back portion (B), and the trim cover assembly (BT) is affixed on a whole of that foam padding (BP).

Designation (5) denotes an upwardly arcuate lower end region of the foregoing upper seat back portion (B), which is one part for defining an undermentioned second vent through-hole (H2) forming one of the afore-stated vent means (V).

In this context, it is noted that, hereinafter, the wording, "forward direction" or "forward", and the wording, "backward direction" or "backward", shall refer to a direction to the forward side (F) of seat (S) and a direction to a backward side (R) of seat (S), respectively.

Figure 4:
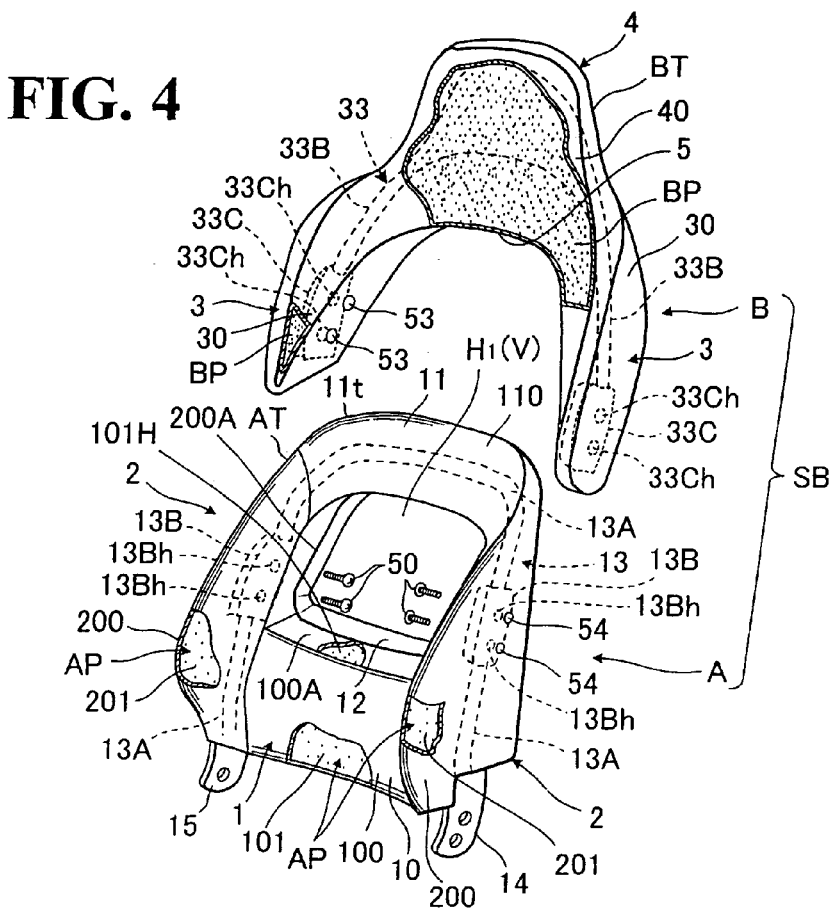
FIG. 4 is an exploded perspective view of the seat back, which shows the upper and lower seat back portions thereof.

As best seen in FIG. 4, each of the two side support frames (33B) has a securing plate frame (33C) fixed to the lower end portion thereof. Otherwise stated, a pair of securing plate frames (33C) are provided in the respective two shoulder support regions (3) of upper seat back portion (B). Those two securing plate frames (33C) are each formed with a pair of connecting holes (33Ch) (33Ch) therein.

Figure 3:
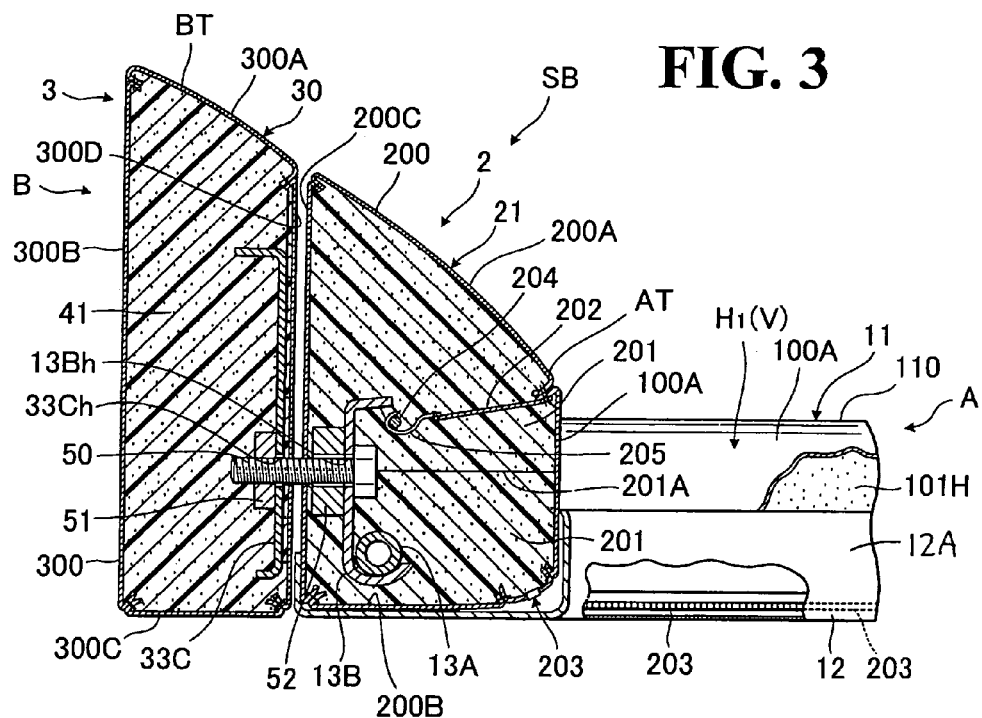
FIG. 3 is a partly broken sectional view taken along the line III—III in the FIG. 1, which shows one mode of first vent hole formed in the seat back.

As best understandable from FIGS. 3 and 4, the trim cover assembly (BT) is divided into: a headrest trim cover assembly portion (40) covering an area of the foam padding (BP) corresponding to the headrest region (4); and a pair of shoulder support trim cover assembly portions (30) (30) which cover the respective two downwardly extending bifurcated areas of foam padding (BP) corresponding to the respective pair of shoulder support regions (3).

As understandable from FIG. 3 in cross-section, one of the two shoulder support trim cover assembly portions (30) is formed by sewing together a forward cover material (300A), an outer cover material (300B), a backward cover material (300C), and an inward cover material (300D). This is however not limitative, and, as naturally known in the art, it should be understood that other cover materials may be sewn with those materials to form a whole of each of the shoulder support trim cover portions (30).

While not clearly shown, but as understandable from FIGS. 3 and 4, a pair of connecting holes (53) (53) are formed in the inward cover material (300D) of each of the two shoulder support trim cover assembly portions (30) so as to be in alignment with the respective two connecting holes (33Ch) of each securing plate frame (33C) stated above.

As illustrated, the lower seat back portion (A) includes a first vent through-hole (H1) defined in the main back support region (1) thereof, the first vent through-hole (H1) naturally opening in both forward and backward surfaces of the lower seat back portion (A) and forming one of the afore-stated vent means (V). Designations (11) and (10) denote upper and lower areas of the main back support region (1), respectively, which are defined vertically in relation to the first vent through-hole (H1).

Figure 2:
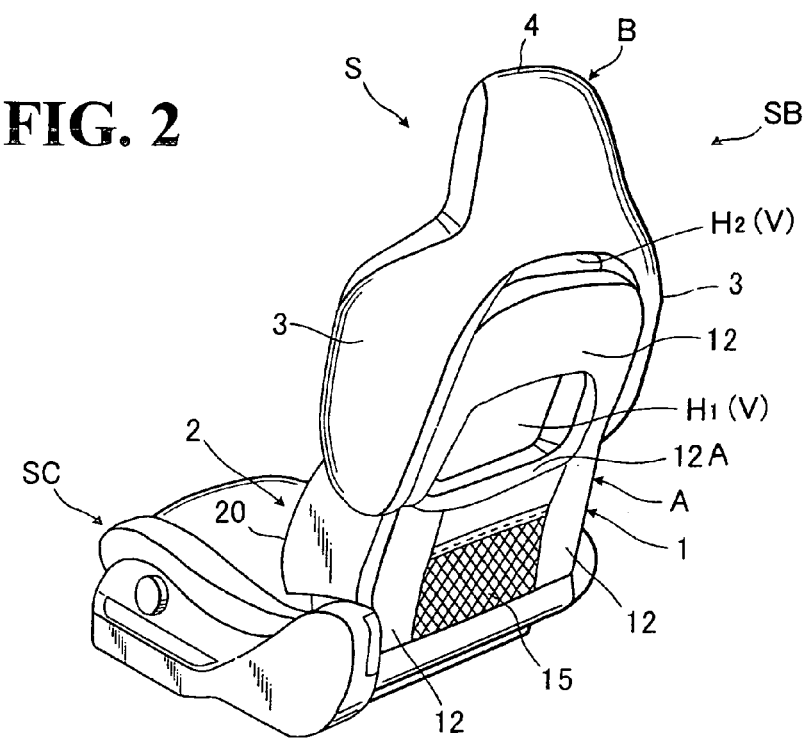
FIG. 2 is a schematic perspective view showing the seat back as well as the automotive seat as seen from the backward side thereof.

As best shown in FIG. 4, the lower seat back portion (A) is basically formed by: a typical backrest frame (13) of a generally "inverted U" shape having a pair of lateral frame portions (13A) (13A) and a pair of securing plate frames (13B) (13B); a foam padding (AP) integrally formed on a whole of those frame elements (13A, 13B); and a trim cover assembly (AT) affixed on that foam padding (AP). In addition, as seen in FIG. 2, the lower seat back portion (A) includes a back cover (12) of synthetic resin material securely attached to the backward side thereof, and a net (15) adapted for receipt of articles, which is provided to the lower area of the backward side of the lower seat back portion (A). The back cover (12) has a generally annular cover region (12A) adapted to cover a half of the first vent through-hole (H1) as shown.

Specifically, each of the two securing plate frames (13B) has a pair of connecting holes (13Bh) formed therein and is fixedly attached at one end thereof to each lateral frame portion (13A) as shown in FIG. 3. The two lateral frame portions (13A) are firmly connected with two upper arms (14) (15) associated with a reclining device (see RD in FIG. 1), so that the lower seat back portion (A) as well as the upper seat back portion (B), or a whole seat back (SB), are operatively connected via the reclining device (RD) with the seat cushion (SC) so as to be adjustably inclinable forwardly and backwardly relative to the latter.

As best understandable from FIGS. 3 and 4, the foam padding (AP) is formed in a predetermined outer shape having: a central padding portion (101) corresponding to the main back support region (1); a generally rectangular (or circular) through-hole region (101H) which defines the foregoing first vent through-hole (H1); and a pair of side bolster padding portions (201) corresponding to the respective two protuberant side bolster support regions (2).

In accordance with the present invention, as shown in FIG. 4, the foam padding (BP) of the upper seat back portion (B) is greater in hardness and density than the foam padding (AP) of the lower seat back portion (B).

The trim cover assembly (AT) is basically divided into: an upper main cover section (110) covering an upper area of the foam padding (AP) corresponding to an upper area of the central padding section (at 101 and 10); a lower main cover section (100) covering a lower area of the foam padding (AP) corresponding to the central padding portion (at 11); and a pair of side bolster cover sections (200) (200) covering the two side bolster padding portions (201) (201), respectively. The trim cover assembly (AT) further includes a generally annular cover section (100A) covering the through-hole region (101H) of the foam padding (AP).

As understandable from FIG. 3 in cross-section, one of the two side bolster cover sections (200) is formed by sewing together a forward cover material (200A), an outer cover material (200C), and a backward cover material (200B). This is however not limitative, and, as naturally known in the art, it should be understood that other cover materials may be sewn with those materials to form a whole of each of the side bolster cover portions (200).

While not clearly shown, but as understandable from FIGS. 3 and 4, a pair of connecting holes (54) (54) are formed in the outer cover material (200C) of each of the two side bolster cover sections (200) so as to be in alignment with the respective two connecting holes (13Bh) of each securing plate frame (13B) stated previously.

As shown in FIG. 3, a securing lug (204) is fixed to one end of the securing plate frame (13B), and, securely engaged with that securing lug (204) is a hook portion (205) of an anchor element (202) which has one end fixedly sewn to the connection point where the forward cover material (200) and cover section (100) are sewn together, thereby serving to retain an outer shape of side bolster support region (2).

Designation (201A) denotes a slit formed in the foam padding (200). This slit (201A) is resiliently openable to allow securing bolts (50) and collars (52) to be passed therethrough for a purpose to be set forth later.

Designation (203) denotes a zip fastener connected by sewing between the backward cover material (200B) and the cover section (100). While not shown completely, but it should be understood from FIG. 3 that the zip fastener (203) extends along an entire periphery of the first vent through-hole (H1). As shown, the annular flange region (12A) of the back cover (12) serves to cover and conceal the zip fastener (203).

The upper seat back portion (B) is firmly and integrally connected with the lower seat back portion (A) at their respective securing plate frames (33C) and (13B) by means of securing bolts (50) and nuts (51), as best seen in FIG. 3. Specifically, while not shown clearly, it is to be understood from FIG. 3 that the two securing nuts (51) are welded to the outside surface of the securing plate frame (33C) in alignment with the respective two connecting holes (33Ch). In practical process for connecting the upper seat back portion (B) to the lower seat back portion (A), prior to attaching the back cover (12) to the backward side of the upper seat back portion (B), the two cover sections (100A) (200B) are first unzipped by the zipper fastener (203) and separated from each other along the first vent through-hole (H1), after which, the cover section (100A) is drawn and folded outwardly away from the foam padding (201), so that the slit (201A) is exposed and accessible form the outside. After opening such slit (201A) widely, both collars (52) and securing bolts (50) are inserted through the slit (201A) toward the securing plate frame (13B), and then, each of the securing bolts (50) is passed through the corresponding hole (13Bh) and collar (52) and further passed through the corresponding each of the holes (54) and (53) associated respectively with the lower and upper seat back portion trim cover assemblies (AT) and (BT). Then, the bolt (50) is threadedly driven in the corresponding nut (51). In that way, the two shoulder support regions (33) of the upper seat back portion (B) are closely contacted and firmly connected with the respective two lateral walls of the lower seat back portion (B).

In this regard, it is seen that a second vent through-hole (H2) is defined between the top (11t) of lower seat back portion (A) and the arcuate lower end region (5) of upper seat back portion (B), the second vent through-hole (H2) naturally opening in both forward and backward surfaces respectively of the upper and back seat back portions (B) (A) and forming one of the vent means (V).

Figure 5:
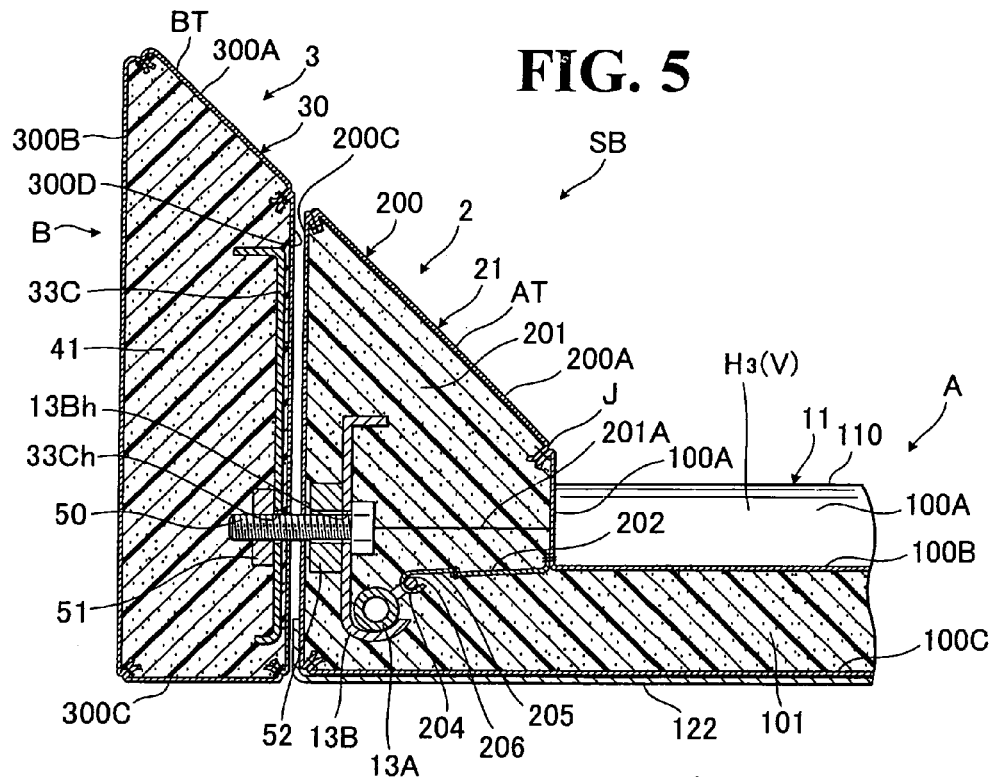
FIG. 5 is a partly broken fragmentary section view of one alternative mode of the seat back, which sows a recessed vent portion as another mode of the first vent hole.

FIG. 5 shows an alternative second mode of the vent means (V), according to which, the first vent through-hole (H1) is modified into a recessed form, thus providing a recessed vent portion (H3). In this suggested mode, as shown, the foam padding (201) is formed with a corresponding recessed portion (not designated, but as seen in FIG. 3) by cutting away a predetermined forward half region of the central padding portion (101) thereof, and, on the other hand, the trim cover assembly (AT) is formed with a generally annular cover section (100A) and a flat cover section (100B). The former cover section (100A). and the latter cover section (100B) cover the corresponding vertical inward wall and flat wall portions of the foregoing recessed portion of the foam padding (201), respectively. The anchor cloth (202) is connected at one end thereof with a corner between those two cover sections (100A) (100B) by sewing, and the hook engagement part (205) of the anchor cloth (202) is securely engaged with the securing lug (206) fixed to the lateral frame portion (13A) of the backrest frame (13). In this embodiment also, the securing bolts (50) and nuts (51) can be inserted through the slit (201A) in order to connect the upper seat back portion (B) with the lower set back portion (A). Namely, in practice, after tearing away the sewn connection line (J) along which one end of the cover section (100A) is sewn with and along one end of the forward cover material (200A), the cover section (100A) is drawn and folded outwardly away from the foam padding (201), so that the slit (201A) is exposed and accessible from the outside. After opening such slit (201A) widely, both collars (52) and securing bolts (50) are inserted through the slit (201A) toward the securing plate frame (13B), and then, each of the securing bolts (50) is passed through the corresponding hole (13Bh) and collar (52) and further passed through the corresponding each of the holes (54) and (53) associated respectively with the lower and upper seat back portion trim cover assemblies (AT) and (BT). Then, the bolt (50) is threadedly driven in the corresponding nut (51) . In that way, the two shoulder support regions (33) of the upper seat back portion (B) are closely contacted with and firmly connected with the respective two lateral walls of the lower seat back portion (B).

Figure 6:
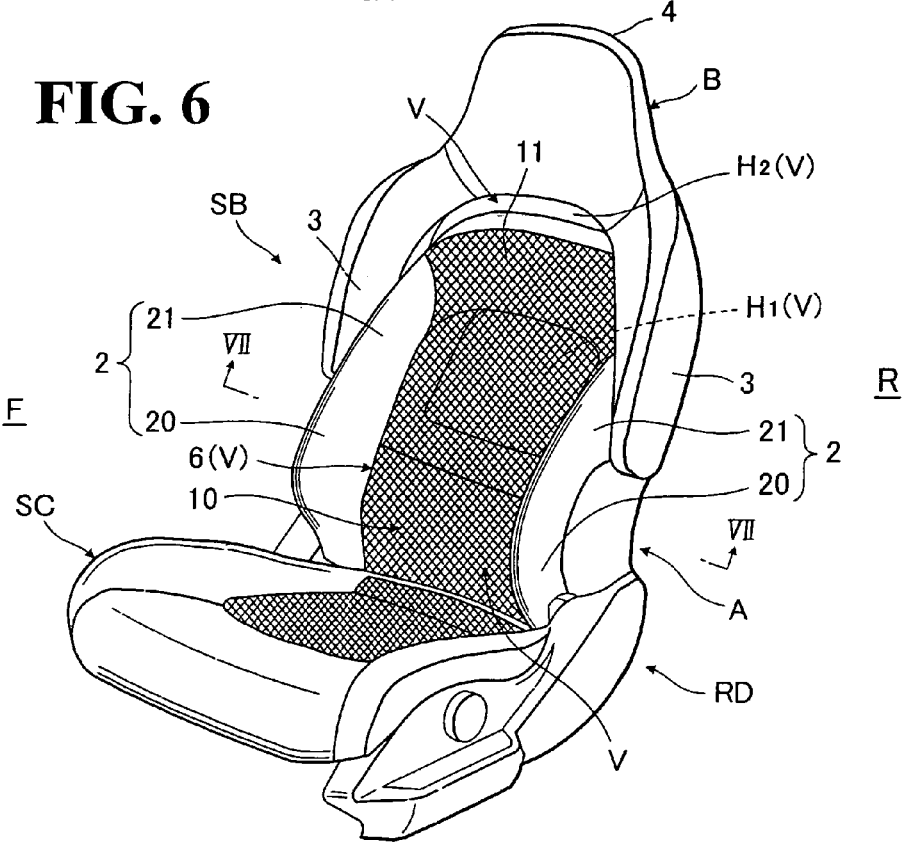
FIG. 6 is a schematic perspective view showing another alternative mode of the seat back.
Figure 8:
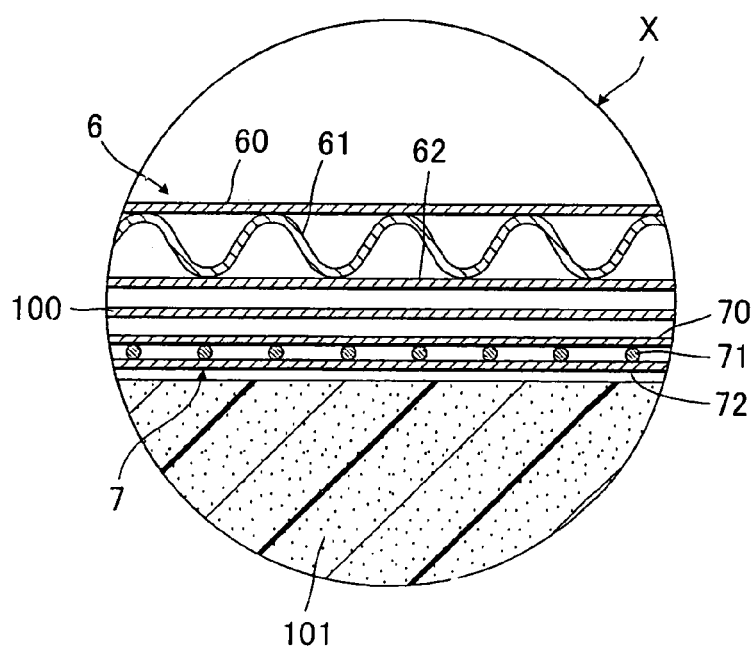
FIG. 8 is an enlarged partial view corresponding to the portion designated by X in the FIG. 7.

FIG. 6 shows an alternative third mode of the vent means (V). In this particular mode, the vent means (V) may be embodied by the combination of a three-dimensional netted sheet (6) and the above-described first and second vent through-holes (H1) (H2) (or the combination of the three-dimensional netted sheet (6) and the vent recessed portion (H3) ) in order to increase ventilation effect to insure preventing a stuffy, hot and moist state at the back portion of a seat occupant which is to contact both upper and lower seat back portions (B.) (A). As best seen in FIG. 8, the three-dimensional netted sheet (6) is of a three-dimensionally knitted structure formed by knitting together an upper network layer (60) and a lower network layer (62) by means of connecting network threads (61) such that the connecting network threads (61) are interposed between the upper and lower network layers (60) (61). This three-dimensional netted sheet (6) itself is known in the art, as disclosed from the Japanese Laid-Open Patent Publications Nos. 2001-89959 and 2003-127737 for example. As shown, the three-dimensional netted sheet (6) is securely attached on a whole of the main back support region (1), overlaying both first and second vent through-holes (H1) (H2). Of course, such netted sheet (6) may be attached on a part of the seat cushion (SC) as illustrated. It is therefore seen that an entirety of the back of a seat occupant is not directly contacted with the main back support region (1), and an air is freely flown through the three-dimensional netted sheet (6) as well as the two vent through-holes (H1) (H2).

Preferably, the color of the three-dimensional netted sheet (6) should be the same as the color of both upper and lower cover sections (100) of trim cover assembly (AT) to maintain a uniform aesthetic appearance of the seat back (SB).

Figure 7:
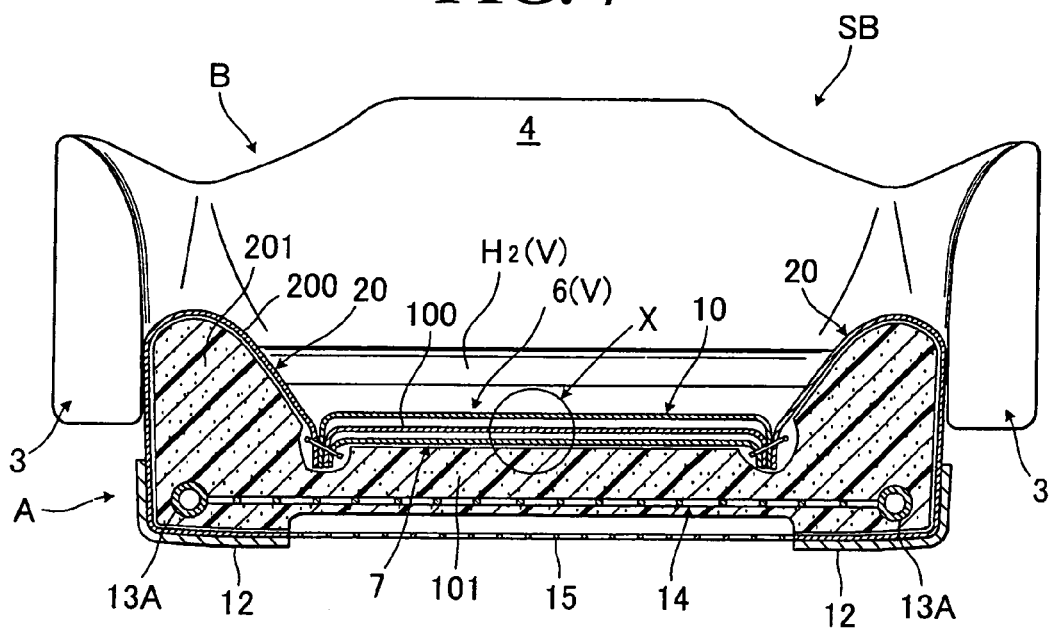
FIG. 7 is a sectional view taken along the line VII—VII in the FIG. 6.

Also, in the present third mode, as shown in FIGS. 7 and 8, a known sheet heater element (7) may be provided in the lower areas (10) of the main back support region (1) of lower seat back portion (A). Specifically, as best seen in FIG. 8, the sheet heater element (7) is formed by a frontal cover cloth (70), a back cover cloth (72) and a heater wiring (71) (e.g. a sinuous heater wire) sandwiched between those two cover cloths (70) (72). This sheet heater element (7) is disposed between the lower area of the central padding portion (101) of the foam padding (AP) and the lower main cover section (100) of the trim cover assembly (AT), wherein, on that lower main cover section (100), is attached the foregoing three-dimensional netted sheet (6).

It is therefore appreciated that the above-constructed seat back (SB) of bucket seat (S) attains the following effects and advantages:

(i) The upper seat back portion (B) is directly connected with the lower seat back portion (A), and further, the connecting parts, i.e. the securing plate frames (13B, 33C) and the securing bolts and nuts (50, 51), are disposed within those seat back portions (B, A). Hence, the entire forward surfaces of upper seat back portion (B) are in a substantially close contact and conformity with the head and shoulder portions of a seat occupant, so that the seat occupant feels a positive and embracing support touch at his or her head and shoulder portions, without feeling any unpleasant hard touch of such exposed connecting parts as found in the prior art. Moreover, the relatively hard and high-density property of the foam padding (BP) of upper seat back portion (B) provides a firm support for holding the seat occupant's head and shoulder portions against a great load and vibration applied thereto during run on a rough road for instance, while on the other hand, the relatively soft and low-density foam padding (AP) of lower seat back portion (A) provides a cushiony buffer effect for absorbing the great load and vibration at the seat occupant's trunk portion.

(ii) The provision of the first and second vent holes (H1) (H2) (including the recessed vent portion (H3) not only greatly reduces a contact area where the head, shoulder and trunk portions of a seat occupant are contacted with the bucket seat (S), but also allows a large amount of air to flow at that contact area. Thus, it is possible to effectively avoid the stuffy, hot and moist condition that can easily occur to seat occupant in this sort of bucket seat.

(iii) The provision of the three-dimensionally netted sheet (6) on the main back support region (1) of the bucket seat (S) keeps an entirety of back of a seat occupant from contact with that main back support region (1). This effectively allows air to flow freely between the back of seat occupant and main back support region (1). Accordingly, when the ambient temperature is high and hot, a sweat from the seat occupant's body is blocked by the netted sheet (6) from the main back support region (1), so that the surfaces of that particular region (1) are not wet with the sweat. Further, when the temperature is low, the netted sheet (6) per se does not become cold and prevents a cold of the main back support region (1) from being imparted to the body of seat occupant. In addition, the netted sheet (6), which is attached only on the main back support region (1), does not impair the embracing deep supportive configuration of the bucket seat (S). Moreover, the three-dimensional robust structure-of the netted sheet (6) serves to widely disperse a great load applied from a seat occupant thereto in a collision case or the like, thereby protecting the sheet heater element (7) against damage due to such great load, which advantageously eliminates the need for laminating a foam wadding layer or other buffer element to the reverse side of the lower main cover section (100) that faces directly to the sheet heater element (7). In this respect, a heat generated from the sheet heater element (7) tends to be stored in the relatively thick and intricately fabricated space of the netted sheet (6), thus expanding and imparting the heat to an entirety of the seat occupant's back portion.

While having described the present invention thus far, it should be understood that the invention is not limited to the illustrated embodiments, but any other modification, replacement, and addition may be applied thereto without departing from the scopes of the appended claims.

What is claimed is:

1. A seat back of automotive seat comprising:
    a lower seat back portion including a foam padding provided therein, said lower seat back portion having a forward surface facing to a side forwardly of said automotive seat and a backward side facing to a side backwardly of the automotive seat;
    an upper seat back portion firmly connected with an upper area of said lower seat back portion, wherein said upper seat back portion includes a foam padding provided therein and has a forward surface facing to a side forwardly of said automotive seat and a backward side facing to a side backwardly of the automotive seat;
    said foam padding of said upper seat back portion being greater in hardness than said foam padding of said lower seat back portion; and
    a vent means allowing air to flow at said lower and upper seat back portions, said vent means comprising:
    a first vent hole means defined in said lower seat back portion,
    said first vent hole means comprising a first through-hole formed through said lower seat back portion so as to open in both said forward and backward surfaces of said lower seat back portion; and
    a second vent hole means defined between said upper and lower seat back portions, said second vent hole means comprising a second through-hole formed through and between said upper and lower seat back portions so as to open in both said forward and backward surfaces of said upper and lower seat back portions.

2. The back seat according to claim 1, wherein said lower seat back portion is so formed to have: a top portion; a main back support region defined centrally thereof; and a pair of side bolster support regions defined on opposite sides of said main back support region, wherein said upper seat back portion is formed in a generally "inverted U" shape comprising: a headrest region defined in the upper area thereof; a pair of shoulder support regions defined in the lower area thereof; and a lower end portion, such that a pair of said shoulder support regions are defined continuously from said headrest region so as to extend downwardly therefrom, wherein said pair of side bolster support regions each have an outer lateral surface, wherein each of said pair of side shoulder support regions is fixedly and integrally attached to said outer lateral surface of each of said pair of side bolster support regions, and said second through-hole is defined between said top portion of said lower seat back portion and said lower end portion of said lower seat back portion.

3. The back seat according to claim 1, wherein said vent means further comprises a netted element provided on said forward surface of said lower seat back portion.

4. The seat back according to claim 3, wherein said netted element overlies said second hole means.

5. The seat back as claimed in claim 1, wherein said upper seat back portion is fixedly connected with said lower seat back portion by a connecting means, and wherein said connecting means is disposed within both said upper and lower seat back portions.

6. A seat back of automotive seat, comprising:
   a lower seat back portion including foam padding provided therein, said lower seat back portion having a forward surface facing to a side forwardly of said automotive seat and a backward side facing to a side backwardly of the automotive seat;
   an upper seat back portion firmly connected with an upper area of said lower seat back portion, wherein said upper seat back portion includes a foam padding provided therein and has a forward surface facing to a side forwardly of said automotive seat and a backward side facing to a side backwardly of the automotive seat;
   said foam padding of said upper seat back portion being greater in hardness than said foam padding of said lower seat back portion;
   a vent means allowing air to flow at said lower and upper seat back portions, said vent means comprising a recessed portion defined in said forward surface of said lower seat back portion said vent means further comprises a netted element provided on said forward surface of said lower seat back portion; and
   wherein said netted element is of a three-dimensional net structure.

7. A seat back of automotive seat comprising:
   a lower seat back portion including a foam padding provided therein, said lower seat back portion having a forward surface facing to a side forwardly of said automotive seat and a backward side facing to a side backwardly of the automotive seat;
   an upper seat back portion firmly connected with an upper area of said lower seat back portion, wherein said upper seat back portion includes a foam padding provided therein and has a forward surface facing to a side forwardly of said automotive seat and a backward side facing to a side backwardly of the automotive seat;
   said foam padding of said upper seat back portion being greater in hardness than said foam padding of said lower seat back portion;
   a connecting means for fixedly connecting said lower and upper seat back portions, said connecting means including: a securing frame means provided in each of said lower and upper seat back portions; and securing bolts and nuts, wherein said securing bolts and nuts are securely connected with said securing frame means, thereby fixedly connecting said lower and upper seat back portions;
   a vent means allowing air to flow at said lower and upper seat back portions, said vent means comprising: a first vent hole means defined in said lower seat back portion; and a second vent hole means defined between said upper and lower seat back portions; and
   a slit formed in said foam padding of said lower seat back portion, said slit extending between said securing frame means and said second vent hole means to allow said securing bolts and nuts to be inserted through said slit in a direction from said second vent hole means to said securing frame means.

* * * * *